(12) United States Patent
Otsuka et al.

(10) Patent No.: US 10,898,938 B2
(45) Date of Patent: Jan. 26, 2021

(54) METHOD FOR MANUFACTURING PANEL-LIKE FORMED ARTICLE

(71) Applicant: NIPPON STEEL & SUMITOMO METAL CORPORATION, Tokyo (JP)

(72) Inventors: Kenichiro Otsuka, Tokyo (JP); Koichi Hamada, Tokyo (JP); Yoshiaki Nakazawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 169 days.

(21) Appl. No.: 16/084,201

(22) PCT Filed: Mar. 16, 2017

(86) PCT No.: PCT/JP2017/010658
§ 371 (c)(1),
(2) Date: Sep. 11, 2018

(87) PCT Pub. No.: WO2017/159783
PCT Pub. Date: Sep. 21, 2017

(65) Prior Publication Data
US 2019/0084025 A1  Mar. 21, 2019

(30) Foreign Application Priority Data
Mar. 16, 2016 (JP) ................... 2016-052766

(51) Int. Cl.
*B21D 22/26* (2006.01)
*B21D 24/04* (2006.01)
(Continued)

(52) U.S. Cl.
CPC ............ *B21D 22/26* (2013.01); *B21D 22/02* (2013.01); *B21D 22/20* (2013.01); *B21D 22/22* (2013.01);
(Continued)

(58) Field of Classification Search
CPC .......... B21D 5/01; B21D 22/02; B21D 22/06; B21D 22/20; B21D 22/22; B21D 22/26;
(Continued)

(56) References Cited

U.S. PATENT DOCUMENTS 3,481,293 A * 12/1969 Muench ................. B21D 53/32
72/348
5,187,966 A * 2/1993 Seconde ................. B21D 22/26
72/329
(Continued)

FOREIGN PATENT DOCUMENTS

CA      2164999 A1   8/1996
CA      2315356 C    12/2007
(Continued)

OTHER PUBLICATIONS

Translation; Suzuki JP 03-258415A, Nov. 18, 1991.*
(Continued)

*Primary Examiner* — Edward T Tolan
(74) *Attorney, Agent, or Firm* — Birch, Stewart, Kolasch & Birch, LLP

(57) ABSTRACT

This method for manufacturing a panel-like formed article has preparing a blank material made of a metal sheet having a tensile strength of 390 MPa or more and 980 MPa or less; and press-forming the blank material in a cold manner using a pressing apparatus to form the blank material into the panel-like formed article, in the press-forming, a blank holder, a first punch, and a second punch are relatively moved with respect to a die, thereby pressing the first punch and the second punch to the blank material, and pressing of the second punch to the blank material is completed before pressing of the first punch to the blank material.

9 Claims, 8 Drawing Sheets

(51) Int. Cl.
  *B21D 24/00* (2006.01)
  *B21D 22/20* (2006.01)
  *B21D 22/02* (2006.01)
  *B21D 22/22* (2006.01)
  B21D 53/88 (2006.01)
  B60J 5/04 (2006.01)

(52) U.S. Cl.
  CPC ............. *B21D 24/00* (2013.01); *B21D 24/04* (2013.01); *B21D 53/88* (2013.01); *B60J 5/0413* (2013.01)

(58) Field of Classification Search
  CPC ........ B21D 22/30; B21D 37/08; B21D 53/88; B21D 24/00; B21D 24/04
  See application file for complete search history.

(56) References Cited

U.S. PATENT DOCUMENTS

| | | | | |
|---|---|---|---|---|
| 5,263,887 A | * | 11/1993 | Cagna .................... | H01J 9/142 445/47 |
| 5,600,991 A | * | 2/1997 | Munzen ................. | B21D 22/22 72/348 |
| 6,968,724 B2 | * | 11/2005 | Hubball ................. | B21D 51/38 72/348 |
| 8,051,696 B2 | * | 11/2011 | Yoshida ................. | B21D 25/02 72/347 |
| 8,850,864 B2 | * | 10/2014 | Kubo .................... | B21D 53/88 72/350 |
| 2010/0018280 A1 | | 1/2010 | Maeda et al. | |
| 2012/0325082 A1 | | 12/2012 | Hirotani et al. | |
| 2014/0044585 A1 | | 2/2014 | Naitou et al. | |
| 2015/0336619 A1 | | 11/2015 | Tanaka et al. | |

FOREIGN PATENT DOCUMENTS

| | | | | | |
|---|---|---|---|---|---|
| CN | 102029325 | A | | 4/2011 | |
| CN | 103547694 | A | | 1/2014 | |
| CN | 105324192 | A | | 2/2016 | |
| JP | 59-62819 | U | | 4/1984 | |
| JP | 61-97323 | U | | 6/1986 | |
| JP | 2-93021 | U | | 7/1990 | |
| JP | 3-258415 | A | * | 11/1991 | ............... B21D 5/01 |
| JP | 4-162922 | A | | 6/1992 | |
| JP | 4-162922 | A | * | 6/1992 | ............ B21D 22/26 |
| JP | 8-10861 | A | | 1/1996 | |
| JP | 2001-38426 | A | | 2/2001 | |
| JP | 2011-50971 | A | | 3/2011 | |
| JP | 2011-147970 | A | | 8/2011 | |
| JP | 2013-780 | A | | 1/2013 | |
| JP | 2013-189173 | A | | 9/2013 | |
| RU | 2116854 | C1 | | 8/1998 | |
| RU | 81932 | U1 | | 4/2009 | |
| SU | 1196076 | A1 | | 12/1985 | |
| WO | WO 2012/147963 | A1 | | 11/2012 | |
| WO | WO 2014/106932 | A1 | | 7/2014 | |

OTHER PUBLICATIONS

Russian Notice of Allowance for Russian Application No. 2018132646, dated Jun. 26, 2019, with English translation.
Chinese Office Action and Search Report, dated May 27, 2019, for Chinese Application No. 201780016817.x, with an English translation.
Canadian Office Action for Canadian Application No. 3,016,980, dated Jul. 12, 2019.
International Search Report for PCT/JP2017/010658 (PCT/ISA/210) dated Jun. 13, 2017.
Written Opinion of the International Searching Authority for PCT/JP2017/010658 (PCT/ISA/237) dated Jun. 13, 2017.
Extended European Search Report for European Application No. 17766779.7, dated Jul. 25, 2019.

* cited by examiner

METHOD FOR MANUFACTURING PANEL-LIKE FORMED ARTICLE

TECHNICAL FIELD OF THE INVENTION

The present invention relates to a method for manufacturing a panel-like formed article. More specifically, the present invention relates to a method for manufacturing a panel-like formed article suitable for car door inner panels.

Priority is claimed on the basis of Japanese Patent Application No. 2016-052766, filed on Mar. 16, 2016, the content of which is incorporated herein by reference.

RELATED ART

A car door is manufactured by combining mainly a door inner panel and a door outer panel. To a car door, a window, a window-driving apparatus, an acoustic speaker, a knob, and the like are attached. In order to store these components, a space is required between the door inner panel and the door outer panel. Therefore, for example, a standing wall portion is provided in the door inner panel. In addition, when the car door is closed, it is necessary to seal the inside of the car with the door. Therefore, for example, a level difference portion is provided to the standing wall portion of the door inner panel. The level difference portion of the standing wall portion faces a pillar or the like of a car body, whereby the sealing property of the inside of the car is ensured.

A door inner panel that is used for a car side door or the like is formed by pressing a metal sheet such as a steel sheet. Generally, the door inner panel has a complicated shape, and thus there are cases in which the shape of the metal sheet is significantly changed during the forming of the metal sheet to the door inner panel. In this case, there are cases in which cracks or wrinkles are generated in the formed door inner panel. Therefore, as a material for the door inner panel, a metal sheet having a high workability is used. The metal sheet having a high workability has a low strength, and thus the strength of the door inner panel formed of this metal sheet also becomes low. Therefore, there are many cases in which a reinforcement member such as a belt line reinforcement or a door impact beam is attached to the door inner panel.

Here, Patent Documents 1 to 4 disclose methods for manufacturing a car member such as a B pillar by pressing a metal sheet.

Specifically, Patent Document 1 discloses a technique in which a first formed article and a second formed article which have a standing wall portion are welded together, and these weld formed articles are hot-pressed or rolled, thereby improving the load-bearing performance per unit weight.

In addition, Patent Document 2 discloses a technique in which a relationship between the curvature of a warped wall that is generated during forming and a wrinkle suppression force is obtained in advance, and the wrinkle suppression force is imparted on the basis of the relationship so that the curvature of a warped wall decreases, thereby forming a trapezoidal member of a high-strength steel sheet which has a high dimensional accuracy.

In addition, Patent Document 3 discloses a technique in which a sheet to be worked is pressed by driving a die and a holder of a pressing apparatus in association with each other, thereby preventing the fracturing of a sheet to be worked in the middle of forming or the generation of wrinkles and ensuring the dimensional accuracy of a formed article after the end of forming.

In addition, Patent Document 4 discloses a technique in which wrinkles in a formed article are suppressed by controlling the spacing between a die and a holder during hot press forming.

PRIOR ART DOCUMENT

[Patent Document]

[Patent Document 1] Japanese Unexamined Patent Application, First Publication No. 2013-189173

[Patent Document 2] Japanese Unexamined Patent Application, First Publication No. 2001-38426

[Patent Document 3] Japanese Unexamined Patent Application, First Publication No. 2011-147970

[Patent Document 4] Japanese Unexamined Patent Application, First Publication No. 2011-50971

DISCLOSURE OF THE INVENTION

Problems to be Solved by the Invention

However, the methods disclosed by Patent Documents 1 to 4 are to form a metal sheet in a shape having a low forming difficulty. Therefore, in a case in which a shape having a high forming difficulty (a shape in which each of adjacent standing wall portions has a level difference portion) such as a door inner panel is formed using the methods disclosed by Patents 1 to 4, there are cases in which forming defects such as cracks or wrinkles are generated.

In addition, generally, hot press forming has a higher formability than cold press forming, and thus it is possible to press-form high-strength steel sheets while suppressing the generation of forming defects. However, in a case in which hot press forming is carried out, it is necessary to introduce a facility for hot press forming, and the costs such as the facility cost increase. Therefore, working a high-strength steel sheet with a high accuracy by cold press forming has a significant industrial meaning.

The present invention has been made in consideration of the above-described circumstances, and an object of the present invention is to provide a method for manufacturing a panel-like formed article which is capable of suppressing the generation of forming defects such as cracks or wrinkles when a metal sheet is pressed to a shape having a high forming difficulty.

Means for Solving the Problem

In order to achieve the above-described object, the present invention employs the following.

(1) A method for manufacturing a panel-like formed article having a polygonal top sheet portion, standing wall portions extending from, out of sides of the top sheet portion, at least two adjacent sides, and a level difference portion provided in each of the standing wall portions constituting at least one set of adjacent standing wall portions, the method including preparing a blank material made of a metal sheet having a tensile strength of 390 MPa or more and 980 MPa or less; and press-forming the blank material in a cold manner to form the blank material into the panel-like formed article, in which, in the press-forming, by using a pressing apparatus having a die which has a contour-carving portion in which a shape of the panel-like formed article is formed, a first punch which faces the die and has a front end surface in which a shape of the top sheet portion is formed, a second punch which is adjacent to an outside of the first punch, faces the die, and has a front end surface in which a shape of the level difference portion is formed, and a blank holder which is adjacent to at least a part of an outside of the second punch and faces the die, the blank material is disposed between the die and the blank holder, the first punch, and the second punch, the blank holder, the first punch, and the second punch are relatively moved with respect to the die, thereby pressing the first punch and the second punch to the blank material, and pressing of the second punch to the blank material is completed earlier than pressing of the first punch to the blank material.

(2) In the aspect according to (1), in the press-forming, the pressing of the first punch to the blank material may begin when or after the pressing of the second punch to the blank material is completed.

(3) In the aspect according to (1), in the press-forming, the pressing of the first punch to the blank material may begin before the pressing of the second punch to the blank material is completed.

(4) In any one of (1) to (3), when a depth from a criterion surface facing the blank holder to a level difference surface facing the second punch is represented by d1 (mm), and a depth from the criterion surface to a contour bottom surface facing the first punch is represented by d2 (mm), the contour-carving portion of the die of the pressing apparatus may satisfy $d2 \geq 40$ and $d1/d2 < 0.8$.

(5) In any one of (1) to (4), the blank material may be a steel sheet.

(6) In the aspect according to (5), the steel sheet may be a tailored blank.

(7) In any one of (1) to (6), the blank material may have an opening portion at a location corresponding to the top sheet portion.

Effects of the Invention

According to the respective aspects of the present invention, it is possible to suppress the generation of forming defects such as cracks or wrinkles when a metal sheet is pressed to a shape having a high forming difficulty.

EMBODIMENTS OF THE INVENTION

Hereinafter, individual embodiments of the present invention will be described in detail with reference to drawings. In the present specification and the drawings, constituent elements having substantially the same functional constitution will be given the same reference sign and thus will not be repeatedly described.

First Embodiment

Figure 1:
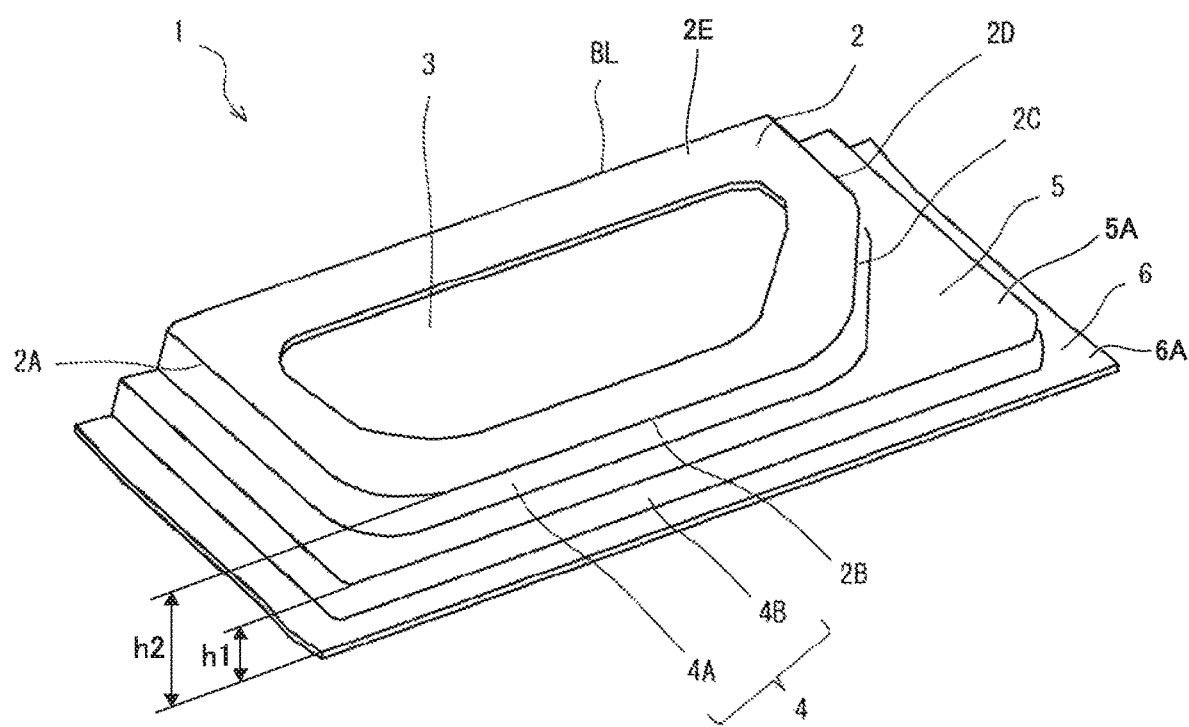
FIG. 1 is a perspective view showing a door inner panel according to a first embodiment of the present invention.

FIG. 1 is a perspective view showing a door inner panel 1 (panel-like formed article) according to a first embodiment of the present invention. The door inner panel 1 is manufactured by press-forming a blank material S which is a metal sheet and has an opening portion 31 (refer to FIG. 2).

The material of the blank material S is, for example, aluminum, an aluminum alloy, titanium, magnesium, or metal such as steel. Meanwhile, as the blank material S, a steel sheet is preferably used. In addition, as the blank material S, a multilayer steel sheet can also be used.

The blank material S has a uniform sheet thickness, and the sheet thickness is, for example, 0.6 to 1.8 mm. In addition, the tensile strength of the blank material S is preferably 390 to 980 MPa, more preferably 590 to 980 MPa, and still more preferably 790 to 980 MPa.

As shown in FIG. 1, the door inner panel 1 includes a top sheet portion 2 having the opening portion 3, standing wall portions 4 which are formed at an outer edge of the top sheet portion 2 and have a level difference portion 5, and a flange portion 6 formed at an outer edge of the standing wall portion 4. Meanwhile, the door inner panel 1 is manufactured using the blank material S having a uniform sheet thickness as described above, and thus the sheet thickness of the door inner panel 1 is uniform throughout the entire area. However, strictly speaking, the sheet thickness is slightly uneven due to press forming.

The planar shape of the top sheet portion 2 is a pentagonal shape.

Meanwhile, the planar shape of the top sheet portion 2 is not limited to a pentagonal shape and may be, for example, a quadrilateral shape. That is, the planar shape of the top sheet portion 2 simply needs to be a polygonal shape. In addition, an R portion may be provided in each of corner portions of the top sheet portion 2.

Meanwhile, in FIG. 1, one side of the top sheet portion 2 represented by a reference sign BL serves as a belt line BL when the door inner panel 1 is disposed in a car body. That is, the door inner panel 1 is disposed in the car body so that the one side BL is located on a car upper side. In addition, the belt line BL is present on a window entrance and exit side. Therefore, the standing wall portion is not present in the belt line BL.

The standing wall portion 4 extends from, out of five sides of the pentagonal top sheet portion 2, four sides 2A, 2B, 2C, and 2D except for the side on the car upper side (the belt line BL). In addition, the respective standing wall portions 4 extending from these four sides are adjacent to each other. Meanwhile, the standing wall portions 4 do not necessarily need to extend from the above-described four sides and may extend from, out of the sides of the top sheet portion 2, at least two adjacent sides.

As described above, the standing wall portions 4 are formed in the top sheet portion 2 of the door inner panel 1, and thus, when the door inner panel 1 and a door outer panel are combined together, a space for storing a window or the like is formed between the door inner panel and the door outer panel.

Each of the four adjacent standing wall portions 4 has a top sheet portion-side standing wall portion 4A, a flange portion-side standing wall portion 4B, and the level difference portion 5 connecting the top sheet portion-side standing wall portion and the flange portion-side standing wall portion. Specifically, the level difference portion 5 extends toward the outside from the top sheet portion-side standing wall portion 4A that is approximately perpendicularly connected to the top sheet portion 2 and extends approximately parallel to the top sheet portion 2. That is, the surface of the level difference portion 5 is parallel to the surface of the top sheet portion 2. In addition, the outer edge of the level difference portion 5 is connected to the flange portion-side standing wall portion 4B that is approximately perpendicularly connected to the flange portion 6.

Meanwhile, FIG. 1 shows a case in which the four adjacent standing wall portions 4 have the level difference portion 5. That is, a case in which there are three sets of the adjacent standing wall portions 4 and these three sets all have the level difference portion 5 is shown. However, the number of the sets of the standing wall portions 4 having the level difference portion 5 is not limited to three, and, out of the sets of the adjacent standing wall portions 4, at least one set needs to have the level difference portion 5. In addition, FIG. 1 shows a case in which the level difference portion 5 having one level is provided in the standing wall portion 4, but the number of levels in the level difference portion 5 is not limited to one and may be plural.

The top sheet portion 2 has the pentagonal opening portion 3 provided so as to let the circumferential edge portion of the top sheet portion remain. The shape of the opening portion 3 is not limited to a pentagonal shape and may be, for example, a circular shape, an elliptical shape, a polygonal shape other than a pentagonal shape, or the like. In addition, in the door inner panel 1, an acoustic speaker, a knob, and the like are attached to the opening portion 3.

Meanwhile, the top sheet portion 2 of the door inner panel 1 may not have the opening portion 3. However, in a case in which the door inner panel 1 is manufactured by press-forming a steel sheet, the top sheet portion 2 of the door inner panel 1 is formed by the stretch flange deformation of the steel sheet. Therefore, in the case of forming the top sheet portion 2 having the opening portion 3, the stretch flange deformation of the steel sheet becomes easier, and the generation of forming defects becomes more difficult compared with the case of forming the top sheet portion 2 not having the opening portion 3. Therefore, the top sheet portion 2 of the door inner panel 1 preferably has the opening portion 3 from the above-described viewpoint.

Here, the forming difficulty of a panel-like formed article in which the level difference portion 5 is provided to the standing wall portions 4 adjacent to each other like the door inner panel 1 is high, and thus forming defects such as cracks or wrinkles are likely to be generated during press forming.

Therefore, in the related art, in the case of forming a formed article having a complicated shape, a highly ductile low-strength steel sheet was used as a material. The low-strength steel sheet refers to a steel sheet having a tensile strength of less than 340 MPa. As a result, there was a limitation on the improvement of the impact characteristics of panel-like formed articles. In order to improve the impact characteristics of a panel-like formed article, a reinforcement member such as a belt line reinforcement or a door impact beam is attached to a door inner panel made of the low-strength steel sheet. However, the attachment of the reinforcement member increases the manufacturing costs.

Therefore, the present inventors studied a method for forming a blank material having a high strength (a tensile strength of 390 MPa or more) to a shape of a high forming difficulty. When the strength of a blank material is high, the strength of a formed door inner panel is also high. Therefore, it is not necessary to reinforce the door inner panel using a reinforcement member such as a belt line reinforcement. That is, virtually, the door inner panel and a belt line reinforcement or the like are united. In addition, even in a case in which a reinforcement member is attached to the door inner panel, it is possible to satisfy the impact characteristics using a material that is less expensive than reinforcement members of the related art (a thin material, a low-strength material, or the like). In addition, it is possible to simplify the shape of a reinforcement member that is additionally attached to the door inner panel. Therefore, the use of a high-strength blank material is advantageous from the viewpoint of, for example, the manufacturing costs.

Hitherto, an example of a method for manufacturing the above-described door inner panel 1 has been described. Meanwhile, in the following manufacturing method, a case in which the door inner panel 1 is manufactured using a blank material S made of a steel sheet having a tensile strength of 390 MPa or more will be described as an exemplary example.

[Manufacturing Method]

A method for manufacturing the door inner panel according to the present embodiment includes a preparation step and a press-forming step. In the preparation step, the blank material S made of a steel sheet is prepared. In the press-forming step, the blank material S is pressed, thereby forming the blank material S to the door inner panel 1.

Figure 2:
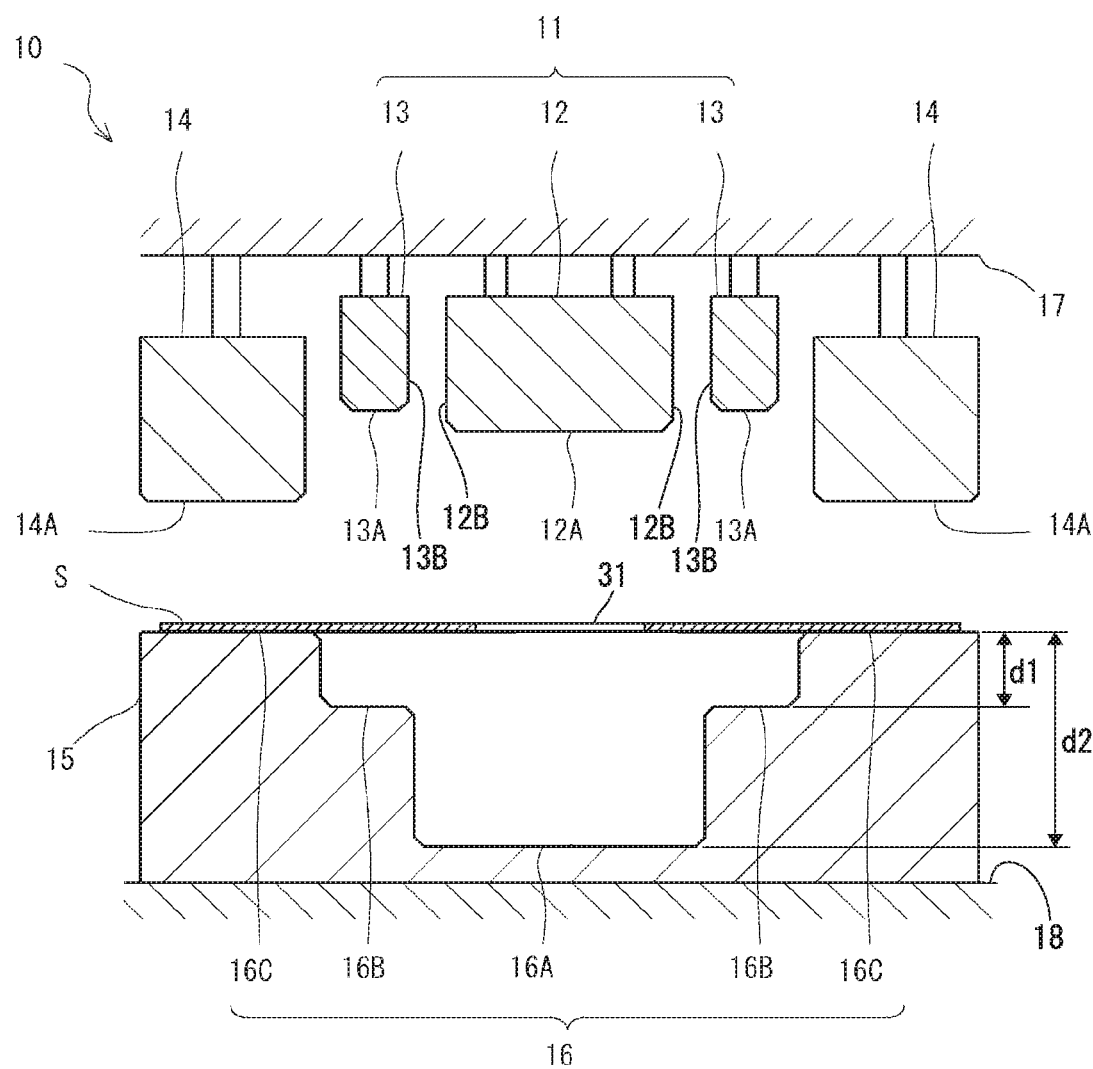
FIG. 2 is a cross-sectional view showing a pressing apparatus according to the first embodiment of the present invention.

Meanwhile, in the present embodiment, the blank material S is formed to the door inner panel 1 having the opening portion 3, and thus the blank material S has the opening portion 31 at a location corresponding to the top sheet portion 2 of the door inner panel 1 as shown in FIG. 2.

[Pressing Apparatus 10]

FIG. 2 is a cross-sectional view showing a pressing apparatus 10 for manufacturing the door inner panel 1 according to the present embodiment. As shown in FIG. 2, the pressing apparatus 10 includes a punch 11 and a blank holder 14 as an upper die and a die 15 as a lower die.

The punch 11 has a first punch 12 facing the die 15 and a second punch 13 which is adjacent to the outside of the first punch 12 and faces the die 15. In other words, the first punch 12 is disposed so that a front end surface 12A thereof faces a contour bottom surface 16A of the die 15. In addition, the second punch 13 is disposed so that an inner surface 13B thereof faces a side surface 12B of the first punch 12 and a front end surface 13A faces a level difference surface 16B of the die 15.

In addition, the punch 11 presses the blank material S into a contour-carving portion 16 of the die 15, thereby forming the blank material S to the door inner panel 1. Therefore, in the front end surface 12A of the first punch 12, the shape of the top sheet portion 2 of the door inner panel 1 is formed. In addition, in the front end surface 13A of the second punch 13, the shape of the level difference portion 5 of the door inner panel 1 is formed.

The blank holder 14 is disposed adjacent to at least a part of the outside of the second punch 13. A front end surface 14A of the blank holder 14 faces a criterion surface 16C of the die 15. In addition, the blank holder 14 sandwiches the blank material S with the criterion surface 16C of the die 15.

The die 15 has the contour-carving portion 16. The contour-carving portion 16 has the contour bottom surface 16A, the level difference surface 16B, and the criterion surface 16C. The contour bottom surface 16A faces the front end surface 12A of the first punch 12. The level difference surface 16B faces the front end surface 13A of the second punch 13.

The first punch 12, the second punch 13, and the blank holder 14 are supported by an upper die holder 17 attached to a slide (not shown). A pressurization member (not shown) is provided between the second punch 13 and the blank holder 14 and the upper die holder 17. The pressurization member is, for example, a hydraulic cylinder, a gas cylinder, a spring, rubber, or the like.

The die 15 is fixed to a lower die holder 18 attached to a bolster plate (not shown).

Meanwhile, the pressing apparatus 10 is not limited to the constitution shown in FIG. 2, and, for example, the first punch 12, the second punch 13, and the blank holder 14 may be respectively attached to individually movable slides.

The contour bottom surface 16A of the die 15 and the front end surface 12A of the first punch 12 form the top sheet portion 2 of the door inner panel 1. The level difference surface 16B of the die 15 and the front end surface 13A of the second punch 13 form the level difference portion 5 of the door inner panel 1. The criterion surface 16C of the die 15 and the front end surface 14A of the blank holder 14 form the flange portion 6 of the door inner panel 1.

In the die 15, a depth d1 from the criterion surface 16C to the level difference surface 16B and a depth d2 from the criterion surface 16C to the contour bottom surface 16A are preferably set to satisfy conditions of d2≥40 mm and d1/d2<0.8. Here, the depth d1 and the depth d2 respectively correspond to a height h1 and a height h2 of the door inner panel 1 shown in FIG. 1. Meanwhile, the height h1 is a height from the flange portion 6 to the level difference portion 5 (a distance from an outer surface 6A of the flange portion 6 to an outer surface 5A of the level difference portion 5: refer to FIG. 1), and the height h2 is a height from the flange portion 6 to the top sheet portion 2 (a distance from the outer surface 6A of the flange portion 6 to an outer surface 2E of the top sheet portion 2: refer to FIG. 1).

The reason for setting d1 and d2 so as to satisfy the above-described conditions is that, in the case of d2<40 mm, the space for storing a window or the like is too small, and, in the case of d1/d2≥0.8, the distance between the top sheet portion 2 and the level difference portion 5 is close, and thus the sealing property in a car degrades.

Next, the respective steps of the manufacturing method according to the present embodiment will be described.

[Preparation Step]

In the preparation step, a blank material made of a steel sheet is prepared. The manufacturing method according to the present embodiment is particularly effective in a case in which the tensile strength of the blank material S is 390 MPa or more and 980 MPa or less. This is because, in a case in which the tensile strength of the blank material is less than 390 MPa, the impact characteristics of a formed door inner panel degrade, and, in a case in which the tensile strength of the blank material S is greater than 980 MPa, the workability of the blank material S degrades, and the forming of a door inner panel having a shape with a high forming difficulty is difficult.

In addition, the manufacturing method according to the present embodiment is particularly effective in a case in which the thickness t of the steel sheet is 0.6 mm or more and 1.8 mm or less. This is because, in a case in which a thickness t is less than 0.6 mm, the impact characteristics of a formed door inner panel are poor, and, in a case in which the thickness t is larger than 1.8 mm, the advantage becomes poorer from the viewpoint of the weight reduction of a car body.

[Press-Forming Step]

Figure 3A:
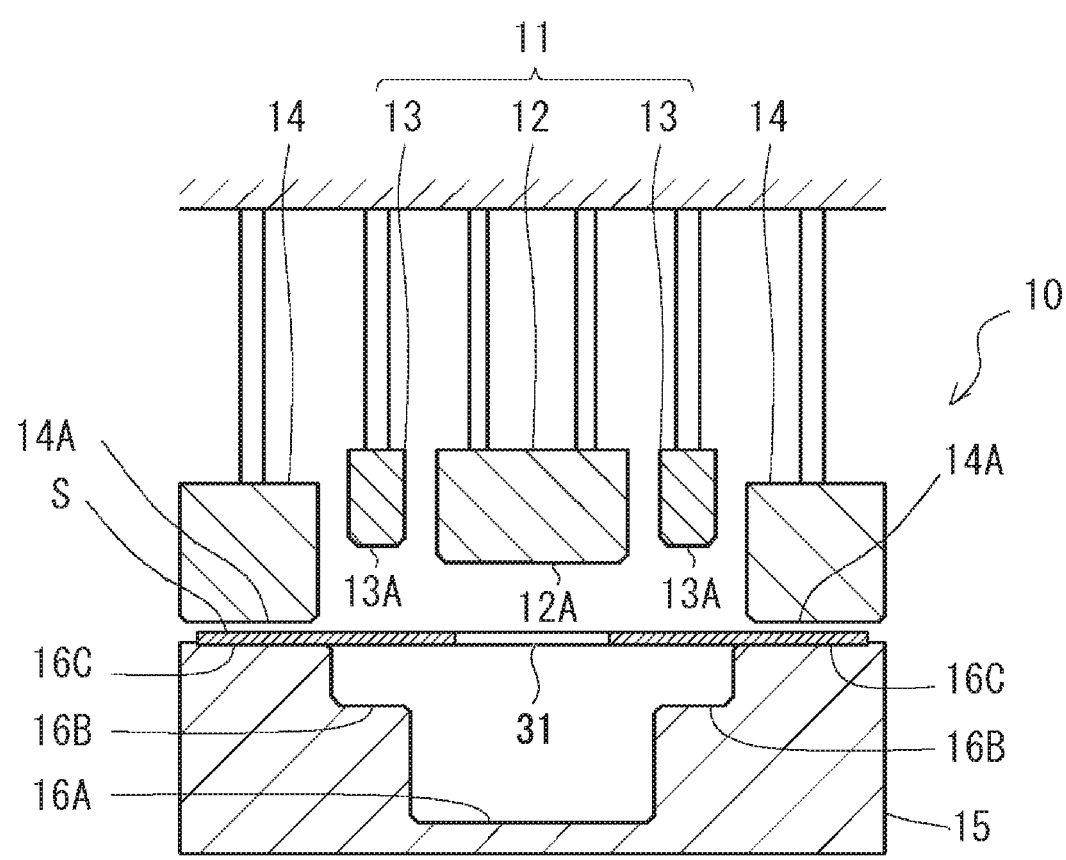
FIG. 3A is a cross-sectional view showing the pressing apparatus and a view showing a state of an initial phase of forming.
Figure 3B:
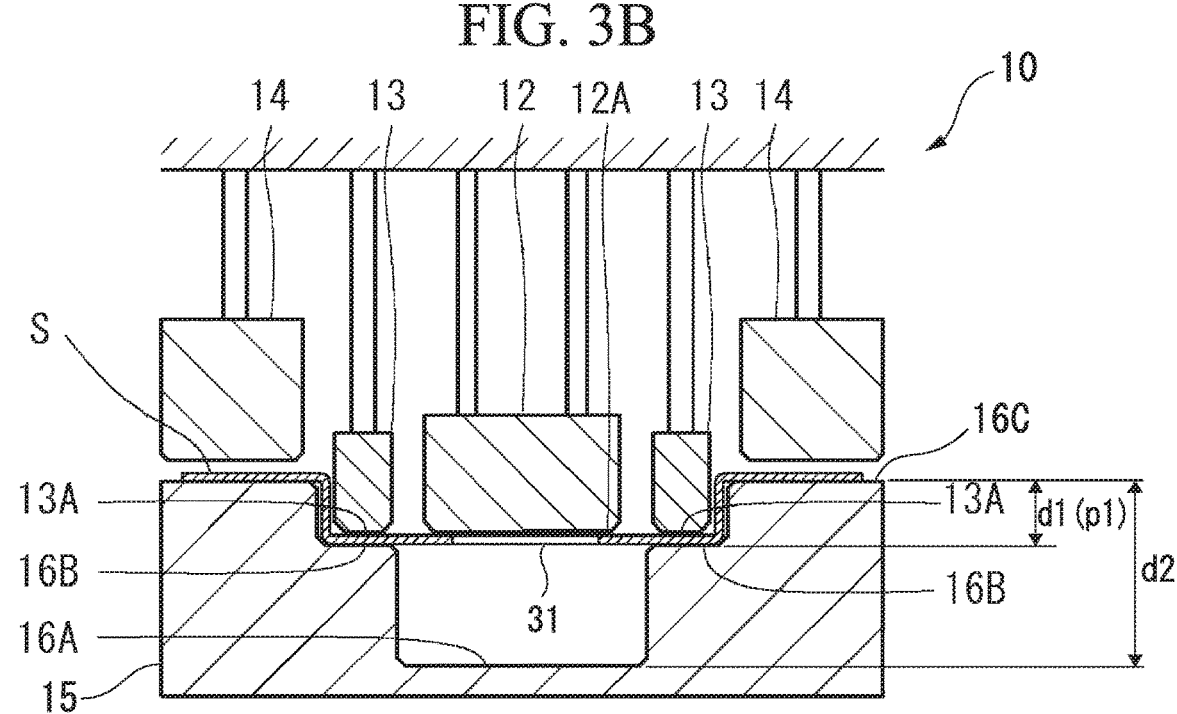
FIG. 3B is a cross-sectional view showing the pressing apparatus and a view showing a state of a middle phase of forming.
Figure 3C:
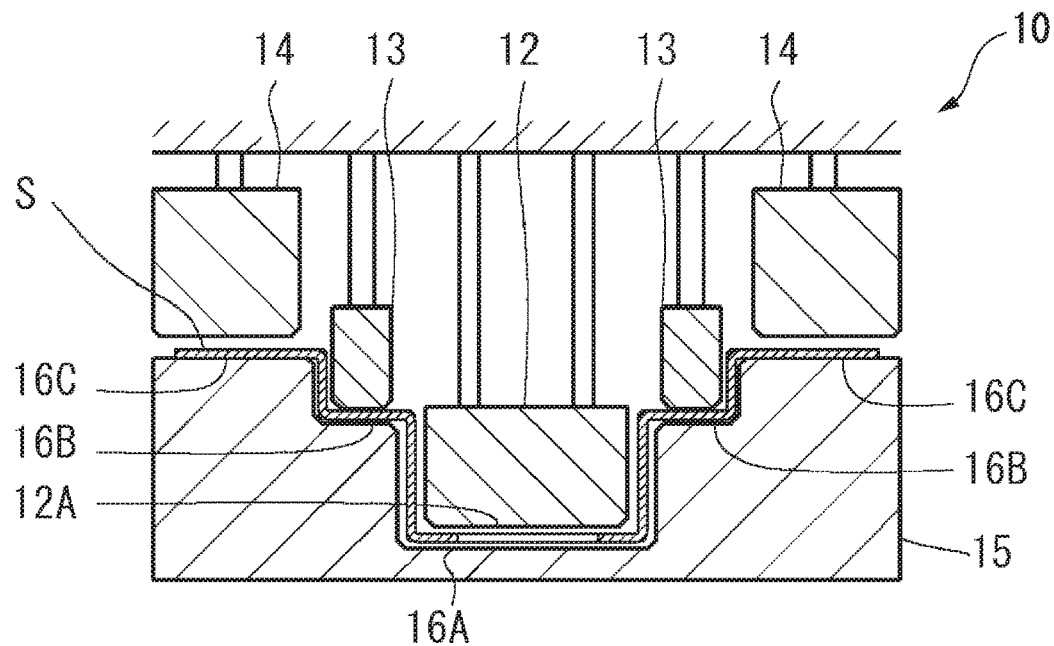
FIG. 3C is a cross-sectional view showing the pressing apparatus and a view showing a state of a final phase of forming.

FIG. 3A to FIG. 3C are cross-sectional views showing the pressing apparatus 10 and views for describing the press-forming step according to the present embodiment. FIG. 3A shows a state in which the blank material S is sandwiched by the blank holder 14 and the die 15. FIG. 3B shows a state in which pressing by the second punch 13 is completed. FIG. 3C shows a state in which pressing by the first punch 12 is completed.

In addition, the press-forming step according to the present embodiment is carried out in a cold manner.

As shown in FIG. 3A, the blank material S is disposed immediately above the die 15 of the pressing apparatus 10. In addition, after the disposition of the blank material S, the slide (not shown) moves down. Therefore, the blank material S is sandwiched by the front end surface 14A of the blank holder 14 and the criterion surface 16C of the die 15.

Meanwhile, the holding of the blank material S by the blank holder 14 and the die 15 does not need to be completed before the beginning of forming by the punch 11 and simply needs to be carried out until the completion of forming by the second punch.

When the slide further moves down from the state shown in FIG. 3A, the punch 11 presses the blank material S, and the blank material S is pulled into the die 15. In addition, when the punch 11 moves down until the blank material is held by the second punch 13 and the die 15 (until the second punch 13 hits the bottom) as shown in FIG. 3B, the pressing of the blank material S by the second punch 13 is completed.

Here, "holding the blank material" refers to the fact that the blank material is completely sandwiched between the front end surface 13A of the second punch 13 and the level difference surface 16B of the die 15 and thus cannot be pressed any more. In addition, "the completion of the pressing of the blank material" by each of the punches refers to the fact that a state in which the blank material is held is formed.

Meanwhile, FIG. 3B shows a case in which the punch 11 is moved down to the bottom dead point of the second punch 13 so that the front end surface 12A of the first punch 12 becomes as high as the front end surface 13A of the second punch 13 (a case in which the punch 11 is moved down so as to maintain a state in which the front end surface 12A of the first punch 12 and the front end surface 13A of the second punch 13 are on the same surface). That is, in the present embodiment, as soon as the pressing of the second punch 13 to the blank material S is completed, the pressing of the first punch 12 to the blank material S begins.

Therefore, in the state of FIG. 3B (when the pressing of the second punch 13 to the blank material S is completed), a distance p1 (mm) from the criterion surface 16C of the die 15 to the front end surface 12A of the first punch 12 and the depth d1 (mm) become equal to each other.

In addition, when the pressing of the second punch 13 to the blank material S is completed, the height location of the front end surface 12A of the first punch 12 is not limited to the same height location as that of the front end surface 13A of the second punch 13. That is, when the pressing of the blank material by the second punch 13 is completed, the front end surface 12A of the first punch 12 may be at a higher location than the front end surface 13A of the second punch 13. That is, the pressing of the first punch 12 to the blank material S may begin after the pressing of the second punch 13 to the blank material S is completed.

However, in any cases, the pressing of the blank material by the first punch 12 is not completed earlier than the pressing by the second punch 13.

After the pressing of the blank material by the second punch 13 is completed, the first punch 12 further moves down, and the blank material S is pressed by the first punch 12 as shown in FIG. 3C. In addition, the first punch 12 moves down to the bottom dead point, whereby the working of the blank material S is completed, and it is possible to obtain the door inner panel 1. At this time, the portion of the blank material S pressed by the second punch 13 is restrained by the second punch 13. Therefore, it is possible to suppress the generation of wrinkles in the level difference portion 5 of the door inner panel 1. Hereinafter, this fact will be described.

[Suppression of Cracks and Wrinkles]

Figure 4:
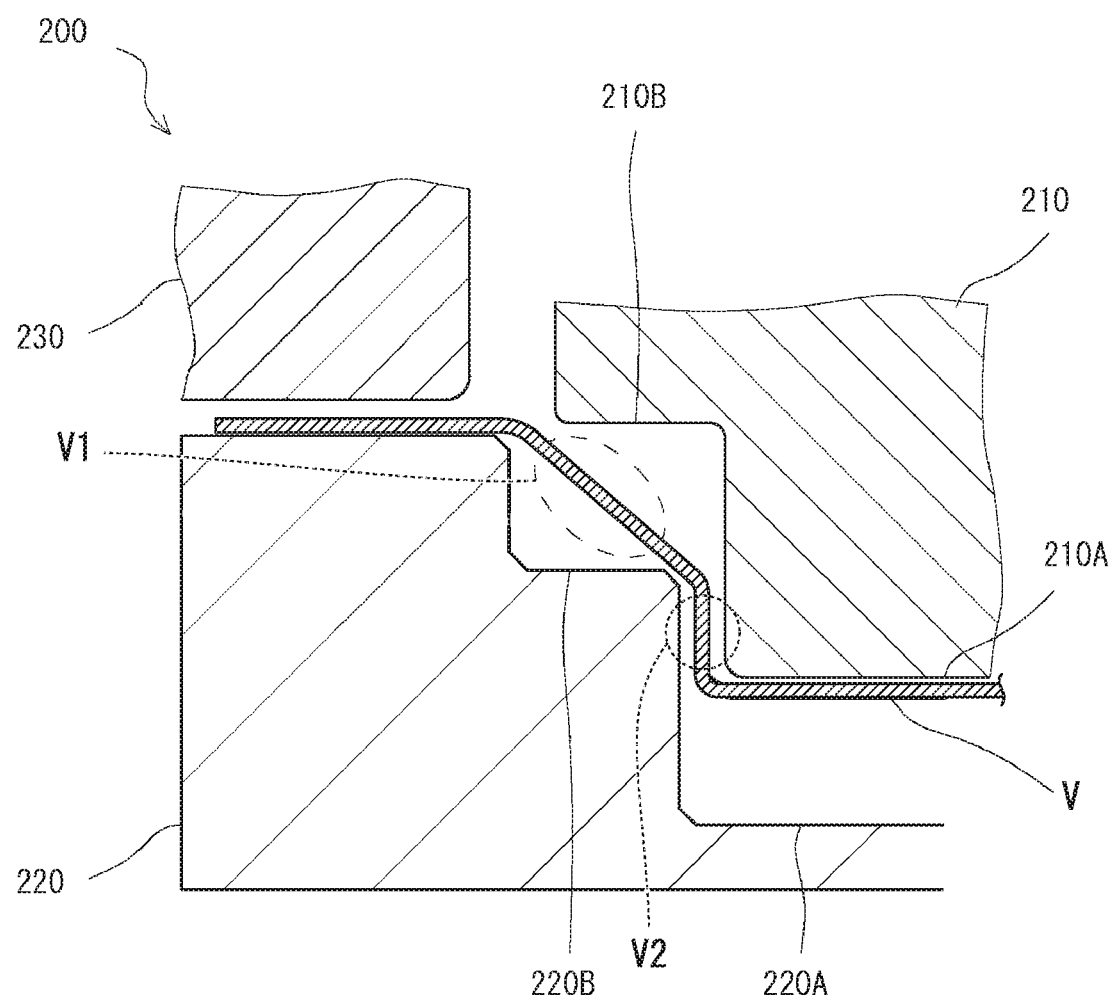
FIG. 4 is a partial cross-sectional view showing a pressing apparatus of the related art and a view showing a state in the middle of forming.

FIG. 4 is a partial cross-sectional view showing a state in the middle of working in a case in which a blank material V not having an opening portion is pressed using a pressing apparatus 200 of the related art. Meanwhile, FIG. 4 shows a vicinity of a level difference surface of a die 220 of the pressing apparatus 200 of the related art in an enlarged manner.

As shown in FIG. 4, in the pressing apparatus 200, front end surfaces 210A and 210B of a punch 210 are integrally formed in the punch 210. Therefore, the front end surfaces 210A and 210B of the punch 210 reach a contour bottom surface 220A and a level difference surface 220B of the die 220 at the same time. Here, the front end surface 210A presses the blank material V a longer distance than the front end surface 210B. Therefore, when the punch 210 is moved down as shown in FIG. 4, the front end surface 210A presses the blank material V in the beginning. At this time, a part V1 of the blank material V is restrained by the front end surface 210B of the punch 210 and the level difference surface 220B of the die 220.

When the punch 210 is moved down, and the front end surface 210A of the punch 210 presses the blank material V as shown in FIG. 4, the blank material V is pulled into the contour bottom surface 220A side of the die 220. Therefore, the material of the blank material V is likely to flow into a region V1 from a region sandwiched by a blank holder 230 and the die 220. When the region V1 is pressed in a state in which the material has flown into the region V1, wrinkles are easily generated in the region V1. In addition, when the front end surface 210A of the punch 210 is pressed to the blank material V in a state in which wrinkles have been generated in the region V1, the flow of the material from the region V1 to a region V2 is inhibited due to these wrinkles. As a result, cracks are likely to be generated in the top sheet portion-side standing wall portion 4A of the door inner panel 1 (refer to FIG. 1) which corresponds to the region V2. Particularly, in a case in which the sheet thickness of the blank material is thin, cracks are likely to be generated.

In contrast, in the method for manufacturing the door inner panel according to the present embodiment, as described above, the pressing apparatus 10 having the first punch 12 and the second punch 13 is used (refer to FIG. 2). In addition, the top sheet portion 2 and the level difference portion 5 of the door inner panel 1 shown in FIG. 1 are formed by individual punches that are separated from each other (the first punch 12 and the second punch 13). Furthermore, the pressing by the second punch 13 is completed earlier than the punching by the first punch 12.

Therefore, the flow of the material into a portion of the blank material S pressed by the second punch 13 from a different portion is suppressed. Therefore, it is possible to suppress the generation of wrinkles in the level difference portion 5 caused by the pressing by the second punch 13. In addition, in a case in which a blank material has an opening portion (in a case in which the blank material S is used), the material flows from the top sheet portion into a portion of the blank material S pressed into by the first punch 12. Therefore, when the door inner panel 1 is manufactured using the blank material S, it is possible to suppress the generation of wrinkles in the level difference portion 5 and the generation of cracks in the top sheet portion-side standing wall portion 4A.

Meanwhile, in the present embodiment, a case in which the blank material S having the opening portion 31 is used has been described (the opening portion 31 of the blank material S corresponds to the opening portion 3 of the door inner panel 1). That is, a case in which the blank material S is mounted on the pressing apparatus 10 so that the opening portion 31 and the contour bottom surface 16A of the die 15 face each other, and the punch 11 is moved down to the bottom dead point, thereby manufacturing the door inner panel 1 having the opening portion 3 in the top sheet portion 2 has been described.

In contrast, for example, in the case of manufacturing the door inner panel 1 not having an opening portion, the blank material S not having an opening portion may be pressed.

However, in a case in which the blank material S has an opening portion (that is, in a case in which a door inner panel having an opening portion is manufactured), the top sheet portion 2 is formed by stretch flange deformation. Specifically, when the blank material S is worked using the first punch 12, the outer edge of the opening portion extends in a direction in which the opening portion widens. Therefore, cracks are not easily generated when the material is pressed by the first punch 12. From this viewpoint, it is preferable to press the blank material S having the opening portion.

Second Embodiment

Next, a second embodiment of the present invention will be described.

In the first embodiment, a case in which the blank material S is pressed using the pressing apparatus 10 has been described. In contrast, in the present embodiment, the blank material S is formed to the door inner panel 1 using a pressing apparatus 10' shown in FIG. 5A to FIG. 5D. Meanwhile, in the pressing apparatus 10' according to the present embodiment, the operation timings of the first punch 12 and the second punch 13 are different from those in the pressing apparatus 10 according to the first embodiment.

Figure 5A:
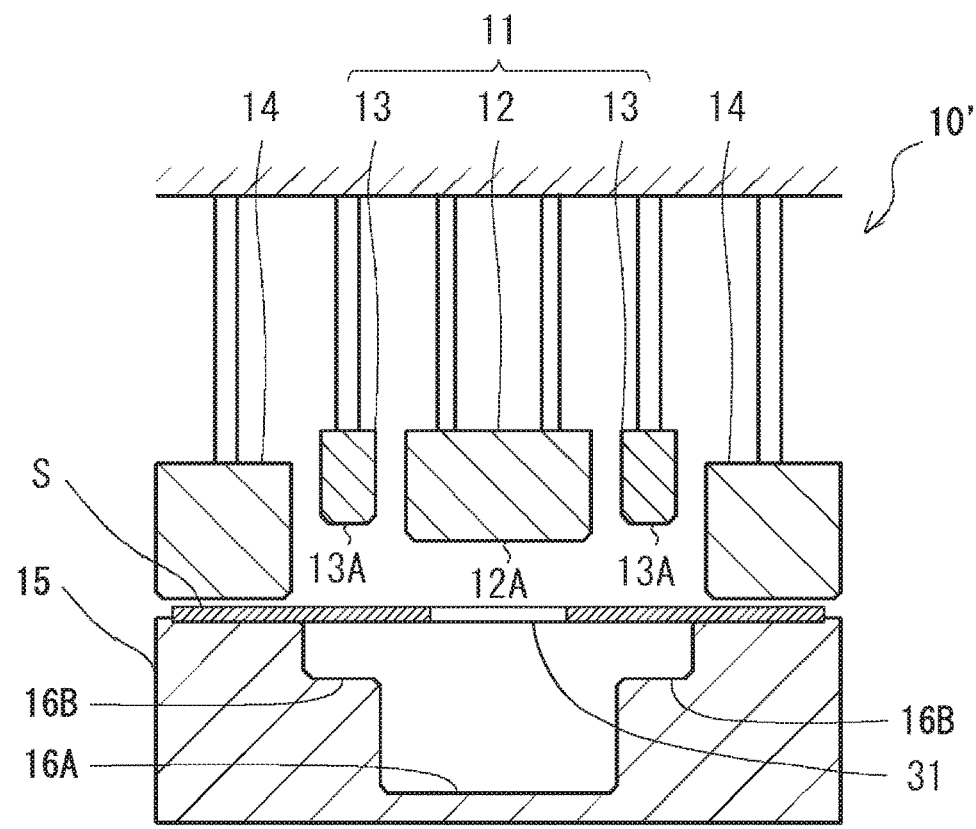
FIG. 5A is a cross-sectional view showing a pressing apparatus according to a second embodiment of the present invention and a view showing a state of an initial phase of forming.
Figure 5B:
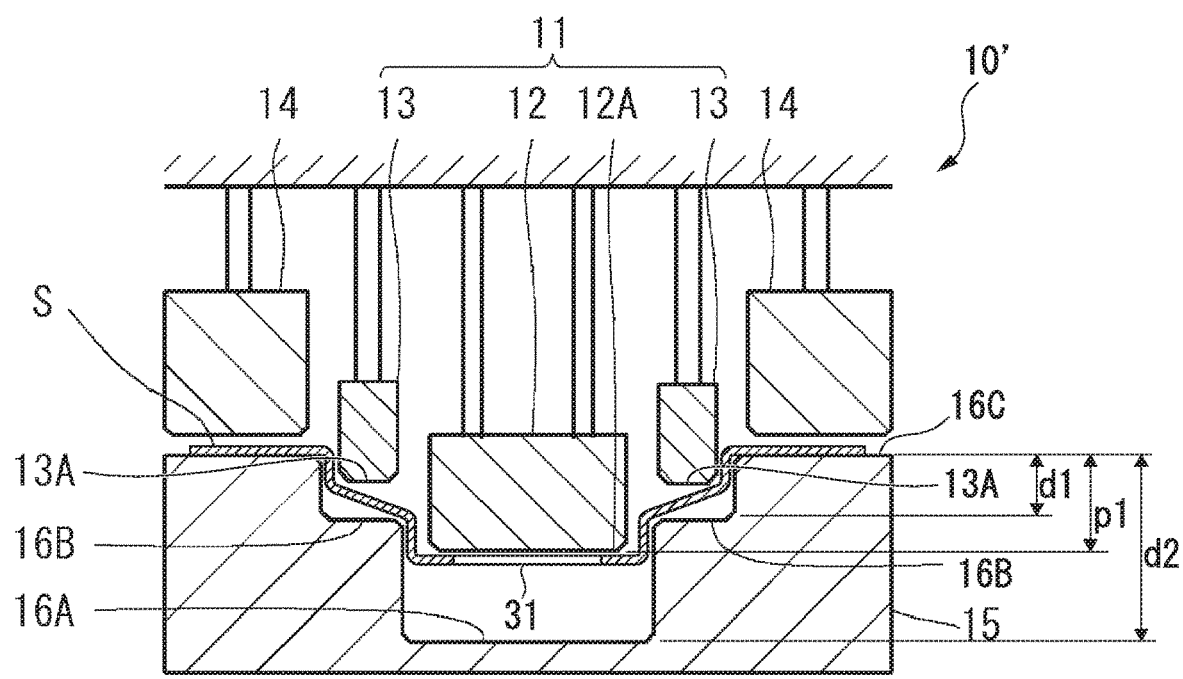
FIG. 5B is a cross-sectional view showing the following of a manufacturing method using the pressing apparatus.
Figure 5C:
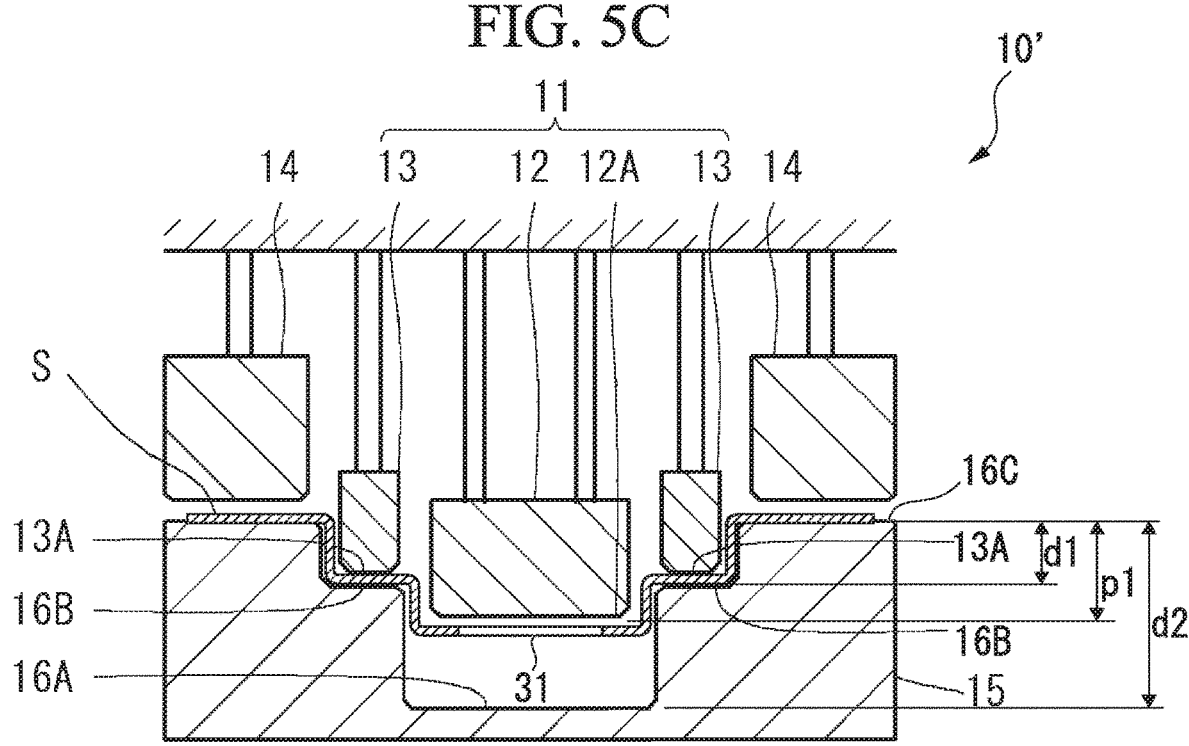
FIG. 5C is a cross-sectional view showing the following of the manufacturing method using the pressing apparatus and a view showing a state of a middle phase of forming.

As shown in FIG. 5C, in a press-forming step according to the present embodiment, when the pressing of the second punch 13 to the blank material S is completed, the front end surface 12A of the first punch 12 is located below the front end surface 13A of the second punch 13. Specifically, when the pressing of the second punch 13 to the blank material S is completed, the distance p1 (mm) from the criterion surface 16C of the die 15 to the front end surface 12A of the first punch 12 becomes greater than d1 (mm). That is, in the press-forming step according to the present embodiment, the pressing of the first punch 12 to the blank material S begins before the pressing of the second punch 13 to the blank material S is completed (refer to FIG. 5B), and the pressing of the first punch 12 to the blank material S is not completed when the pressing of the second punch 13 to the blank material S is completed (refer to FIG. 5C).

Figure 5D:
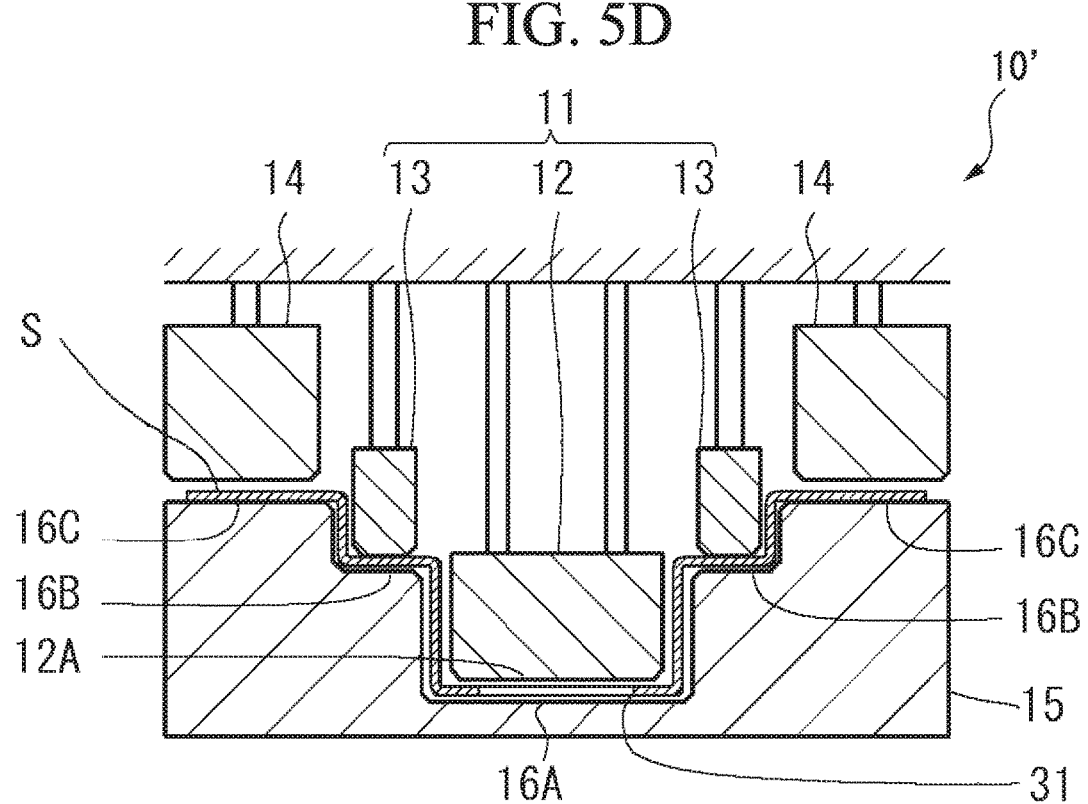
FIG. 5D is a cross-sectional view showing the following of the manufacturing method using the pressing apparatus and a view showing a state of a final phase of forming.

In addition, the first punch 12 is further moved down to the bottom dead point from the state shown in FIG. 5C, whereby the blank material S is further pressed by the first punch 12, and the pressing of the blank material S is completed (refer to FIG. 5D).

In the manufacturing method according to the present embodiment, similar to the first embodiment, the second punch 13 restrains the blank material before the pressing by the first punch 12 is completed. Therefore, it is possible to suppress the generation of wrinkles in the level difference portion 5 and the generation of cracks in the top sheet portion-side standing wall portion 4A.

In addition, in the manufacturing method according to the present embodiment, the pressing of the first punch 12 to the blank material S begins before the pressing of the second punch 13 to the blank material S is completed. In contrast, in the manufacturing method according to the first embodiment, the pressing of the first punch 12 to the blank material S begins when the pressing of the second punch 13 to the blank material S is completed (refer to FIG. 3B and FIG. 3C). Therefore, in the manufacturing method according to the present embodiment, it is possible to reduce the sheet thickness reduction percentage of the top sheet portion 2 more than in the manufacturing method according to the first embodiment.

The above-described fact will be described in detail. In the case of the first embodiment, during the pressing of the first punch 12 to the blank material S, the material does not easily flow into a portion inside the portion of the blank material S which is restrained by the second punch 13 (refer to FIG. 3B) into the restrained portion, and thus the sheet thickness reduction percentage of the top sheet portion 2 of the door inner panel 1 increases. On the other hand, in the case of the present embodiment, as shown in FIG. 5C, the first punch 12 presses the blank material S to a certain extent before the blank material S is restrained by the second punch 13, and thus the sheet thickness reduction percentage of the top sheet portion 2 becomes smaller than in the case of the first embodiment. Therefore, the present invention is preferred from the viewpoint of suppressing the generation of cracks in the top sheet portion 2 while suppressing the generation of forming defects in the level difference portion 5 and the top sheet portion-side standing wall portion 4A.

EXAMPLES

Next, examples carried out in order to confirm the function effects of the present invention will be described.

Example 1

It was assumed that the blank material S having the opening portion (refer to FIG. 2) was pressed using the pressing apparatus 10 according to the first embodiment and the blank material S was pressed using the pressing apparatus 10' according to the second embodiment, and an analysis was carried out on each pressing work. From the analysis results, the sheet thickness reduction percentage and the curvature of a door inner panel obtained by each pressing work were evaluated. Here, the pressing work using the pressing apparatus 10 according to the first embodiment was assumed to be Invention Example 1. In addition, the pressing work using the pressing apparatus 10' according to the second embodiment was assumed to be Invention Example 2. Furthermore, a pressing work using the pressing apparatus 200 of the related art shown in FIG. 4 was assumed to be a comparative example.

[Analysis Conditions]

As the blank material, five steel sheets shown in Table 1 were used. As shown in Table 1, these five steel sheets were different from one another in terms of the chemical composition and the tensile strength. In addition, the thicknesses of these five steel sheets were set to 0.8 mm.

In consideration of the strain rate dependency of the mechanical characteristics, the movement rates of the first and second punches with respect to the die were set to approximately 40 mm/s. The friction coefficient of the blank material with respect to the punches, the die, and the blank holder was set to 0.4. In the analyses, general-purpose finite element method (FEM) software (manufactured by LIVERMORE SOFTWARE TECHNOLOGY Corporation, trade name: "LS-DYNA") was used.

TABLE 1

| Tensile strength | C (mass %) | Si (mass %) | Mn (mass %) | P (mass %) | S (mass %) | Al (mass %) | Ti (mass %) | Mo (mass %) | B (mass %) |
|---|---|---|---|---|---|---|---|---|---|
| 270 MPa-class | 0.002 | 0.010 | 0.080 | 0.006 | 0.005 | 0.032 | 0.072 | — | — |
| 390 MPa-class | 0.0012 | 0.08 | 1.32 | 0.048 | 0.004 | 0.050 | 0.009 | — | 0.0003 |
| 590 MPa-class | 0.065 | 0.50 | 2.00 | 0.020 | 0.010 | 0.030 | — | 0.1 | — |
| 780 MPa-class | 0.070 | 0.70 | 2.4 | 0.020 | 0.003 | 0.030 | — | — | — |
| 980 MPa-class | 0.130 | 1.5 | 2.2 | 0.020 | 0.003 | 0.008 | 0.03 | — | — |

In addition, in order to verify the relationship between the forming depth h2 (mm) (refer to FIG. 1) of the door inner panel and the function effects of the present invention, two dies having different depth dimensions were used. Specifically, in order to form a door inner panel having a shallow forming depth (40<h2 (mm)<80), in one of the two dies (first die), the depth d2 was set to 75 mm, and the depth d was set to 30 mm. In addition, in order to form a door inner panel having a deep forming depth (80<h2 (mm)<120), in the other of the two dies (second die), the depth d2 was set to 115 mm, and the depth d1 was set to 30 mm. That is, in the door inner panel formed using the first die, h2 was 75 mm, and h1 was 30 mm. In addition, in the door inner panel formed using the second die, h2 was 115 mm, and h1 was 30 mm.

In Invention Example 1, the first punch and the second punch were set to come into contact with the blank material at the same time. That is, in Invention Example 1, when the pressing by the second punch 13 was completed, the height location of the front end surface 12A of the first punch 12 and the height location of the front end surface 13A of the second punch 13 were equal to each other as shown in FIG. 3B.

On the other hand, in Invention Example 2, the front end surface 12A of the first punch 12 was located below the front end surface 13A of the second punch 13. That is, in Invention Example 2, when the pressing of the blank material by the second punch 13 was completed, the front end surface 12A of the first punch 12 was located 40 mm below the front end surface 13A of the second punch 13 as shown in FIG. 5C. In the comparative example, an integrated punch that was not separated was used.

[Evaluation Method]

The sheet thickness reduction percentages P (%) of the door inner panels obtained by the analyses of the respective press forming works described above and the distributions of the curvatures Q (1/mm) of the surface of the door inner panels were investigated. Here, the sheet thickness reduction percentage P (%) was obtained from the sheet thickness t1 (mm) before the press-forming (the sheet thickness of the blank material) and the sheet thickness t2 (mm) after the press-forming using Expression (1) below.

$$P=((t1-t2)/t1) \times 100 \qquad \text{Expression (1)}$$

In addition, the curvature Q (1/mm) was obtained from the curvature radius r (mm) of the door inner panel using Expression (2) below.

$$Q=1/r \qquad \text{Expression (2)}$$

Here, as the curvature radius r in Expression (2), the absolute value of the curvature radius of the surface of the door inner panel on each of a plurality of cross sections perpendicular to the surface of the door inner panel was used. That is, the curvature Q obtained using Expression (2) also becomes an absolute value. Meanwhile, the curvature was evaluated in a state in which the first punch was located 1 mm above from the bottom dead point.

In addition, from the obtained sheet thickness reduction percentage and the obtained distributions of the curvatures, the maximum values of the sheet thickness reduction percentage and the curvature were respectively obtained. In addition, in a case in which the maximum value of the sheet thickness reduction percentage was greater than 20%, it was determined that cracks were generated in the door inner panel. In addition, in a case in which the absolute value of the curvature was greater than 0.01 mm$^{-1}$, it was determined that wrinkles were generated in the door inner panel.

[Analysis Results]

The analysis results are shown in Table 2 and Table 3. Table 2 shows the results of the door inner panel formed using the die having the depth d2 of 75 mm and the depth d1 of 30 mm (corresponding to the case of the shallow forming depth). Meanwhile, Table 3 shows the results of the door inner panel formed using the die having the depth d2 of 115 mm and the depth d1 of 30 mm (corresponding to the case of the deep forming depth).

Meanwhile, in Table 2 and Table 3, in a case in which at least one of cracks (the sheet thickness reduction percentage exceeded 20%) or wrinkles (the absolute value of the curvature exceeded 0.01 mm$^{-1}$) were generated in the door inner panel, it is determined that forming defects were generated, and "NG" is expressed. On the other hand, in a case in which neither cracks nor wrinkles were generated in the door inner panel, it is determined that forming defects were not generated, and "OK" is expressed.

TABLE 2

| Tensile strength | Comparative Example | Invention Example 1 | Invention Example 2 |
| --- | --- | --- | --- |
| 270 MPa-class | OK | OK | OK |
| 390 MPa-class | NG | OK | OK |
| 590 MPa-class | NG | OK | OK |
| 780 MPa-class | NG | OK | OK |
| 980 MPa-class | NG | NG | OK |

TABLE 3

| Tensile strength | Comparative Example | Invention Example 1 | Invention Example 2 |
| --- | --- | --- | --- |
| 270 MPa-class | OK | OK | OK |
| 390 MPa-class | NG | OK | OK |
| 590 MPa-class | NG | OK | OK |
| 780 MPa-class | NG | NG | OK |
| 980 MPa-class | NG | NG | OK |

As shown in Table 2, in Invention Example 1, forming defects (cracks in the top sheet portion 2 of the door inner panel 1) were generated in a case in which the steel sheet having a tensile strength of 980 MPa was pressed. On the other hand, forming defects were not generated in cases in which other steel sheets (steel sheets having a tensile strength of 270 MPa, 390 MPa, 590 MPa, or 780 MPa) were pressed. In addition, in Invention Example 2, forming defects were not generated in cases in which any of the steel sheets were pressed.

In contrast, in the comparative example, forming defects were not generated in cases in which a steel sheet having a tensile strength of 270 MPa was pressed; however, in cases in which other steel sheets (steel sheets having a tensile strength of 390 MPa, 590 MPa, 780 MPa, or 980 MPa) were pressed, forming defects (cracks in the top sheet portion-side standing wall portion 4A of the door inner panel 1 and wrinkles in the level difference portion 5) were generated.

From the results shown in Table 2, it could be confirmed that, compared with the comparative example, in Invention Examples 1 and 2, the generation of cracks in the top sheet portion-side standing wall portion 4A and the generation of wrinkles in the level difference portion 5 could be suppressed even in a case in which a steel sheet having a higher strength was pressed. In addition, from the comparison between Invention Example 1 and Invention Example 2, it could be confirmed that the steel sheet having a higher strength could be pressed while suppressing the generation of cracks in the top sheet portion 2 in Invention Example 2.

As shown in Table 3, in Invention Example 1, cracks were generated in the top sheet portion 2 in a case in which the steel sheet having a tensile strength of 780 MPa or 980 MPa was pressed. In contrast, in Invention Example 2, similar to the results in Table 2, forming defects were not generated regardless of steel sheets used.

From the comparison between the results in Table 2 and Table 3, it could be confirmed that, compared with Invention Example, 1, the generation of forming defects could be suppressed even in a case in which the forming depth was deep in Invention Example 2. That is, it was found that, in Invention Example 2, it was possible to preferably manufacture the door inner panel 1 having a deep forming depth (the height h2 of the top sheet portion 2 was more than 80 mm and less than 120 mm).

Example 2

Next, as Example 2, the operation timings of the first punch and the second punch and the relationship between the sheet thickness reduction percentage and the curvature were investigated using the pressing apparatus 10 according to the first embodiment and the pressing apparatus 10' according to the second embodiment.

[Analysis Conditions]

As the blank material, among the steel sheets of Example 1 shown in Table 1, the steel sheet having a tensile strength of 590 MPa was used. Meanwhile, the thickness of the steel sheet was set to 0.8 mm as in the case of Example 1.

In addition, one die having different dimensions from the dies used in Example 1 was prepared. Specifically, a die having a depth d1 of 30 mm and a depth d2 of 60 mm was prepared.

In addition, the door inner panels 1 were manufactured under conditions in which, in each of the pressing apparatus 10 and the pressing apparatus 10', the location of the first punch 12 when the second punch 13 hit the bottom (when the second punch 13 reached the bottom dead point) (the distance p1 from the criterion surface 16C of the die 15 to the front end surface 12A of the first punch 12: refer to FIG. 3B and FIG. 5C) was set to be different.

The analysis conditions except for the above-described condition were the same as the analysis conditions of Example 1.

[Evaluation Method]

The distribution of the sheet thickness reduction percentages of the top sheet portion was investigated using Expression (1). In addition, the maximum value of the sheet thickness reduction percentage of the top sheet portion was obtained from this distribution. The evaluation conditions except for the above-described condition were the same as in the evaluation method of Example 1.

[Analysis Results]

Figure 6:
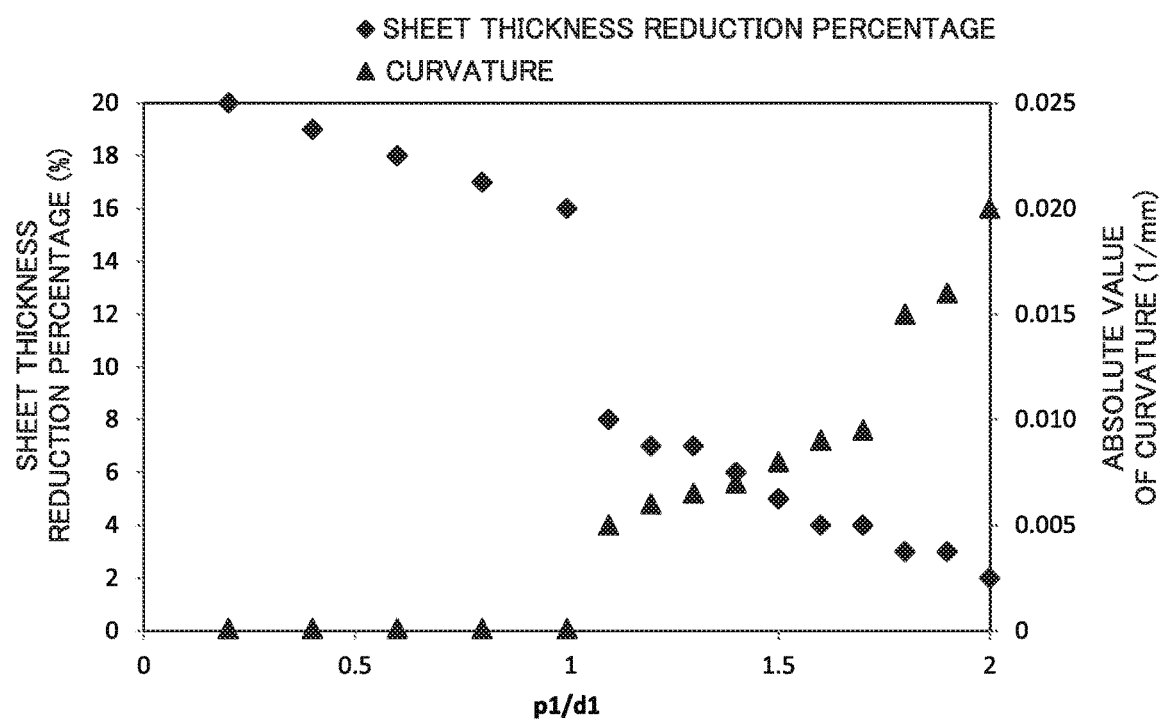
FIG. 6 is a graph showing a relationship among operation timings of a first punch and a second punch, a sheet thickness reduction percentage, and a curvature.

The analysis results are shown in FIG. 6. In FIG. 6, the horizontal axis indicates the ratio p1/d1 of p1 to d1, and the vertical axes indicate the sheet thickness reduction percentage (%) and the absolute value (1/mm) of the curvature respectively. Meanwhile, the sheet thickness reduction percentage (%) is the maximum value of the sheet thickness reduction percentage of the top sheet portion.

Here, plots having p1/d1 of 1 or less indicate the results obtained using the pressing apparatus 10. In addition, plots having p1/d1=1 indicate results obtained in a case in which the door inner panel was manufactured under a condition in which the height location of the front end surface 12A of the first punch 12 and the height location of the front end surface 13A of the second punch 13 were equal to each other (refer to FIG. 3B) when the pressing by the second punch 13 was completed. In addition, plots having p1/d1<1 indicate results obtained in a case in which the door inner panel was manufactured under a condition in which the height location of the front end surface 12A of the first punch 12 was between the criterion surface 16C and the level difference surface 16B of the die 15 (0<p1<d1) when the second punch 13 hit the bottom.

In addition, plots having p1/d1>1 indicate results obtained using the pressing apparatus 10'. Meanwhile, as described above, in the present embodiment, the die having the depth d1 of 30 mm and the depth d2 of 60 mm was used, and thus plots having p1/d1=2 correspond to cases in which the pressing by the first punch 12 and the pressing by the second punch 13 were completed at the same time, that is, the door inner panel was manufactured using the pressing apparatus 200 of the related art (refer to FIG. 4).

As shown in FIG. 6, from p1/d1=1 as a boundary, the curvature increased as p1/d1 increased. From this result, it could be confirmed that, compared with the pressing apparatus 10' (the second embodiment), the pressing apparatus 10 (the first embodiment) is more capable of suppressing the generation of wrinkles.

Meanwhile, from p1/d1=1 as a boundary, the sheet thickness reduction percentage of the top sheet portion decreased as p1/d1 increased. From this result, it could be confirmed that, compared with the pressing apparatus 10 (the first embodiment), the pressing apparatus 10' (the second embodiment) is more capable of suppressing the generation of cracks in the top sheet portion.

Furthermore, in the case of $1.1 \leq p1/d1 \leq 1.7$, the sheet thickness reduction percentage was 15% or less, and the curvature reached 0.01 $mm^{-1}$. That is, it was found that, when p1/d1 is set in this range, it is possible to suppress both cracks in the top sheet portion and wrinkles in the level difference portion.

Hitherto, the respective embodiments of the present invention have been described, but these embodiments are simply proposed as examples, and the scope of the present invention is not limited only to these embodiments. These embodiments can be carried out in a variety of different formats, and a variety of omissions, substitutions, and modifications can be made within the scope of the gist of the invention. These embodiments or modifications thereof are included in the scope of the inventions described in the claims and equivalence thereof as if the embodiments or modifications thereof are included in the scope or gist of the invention.

Figure 7:
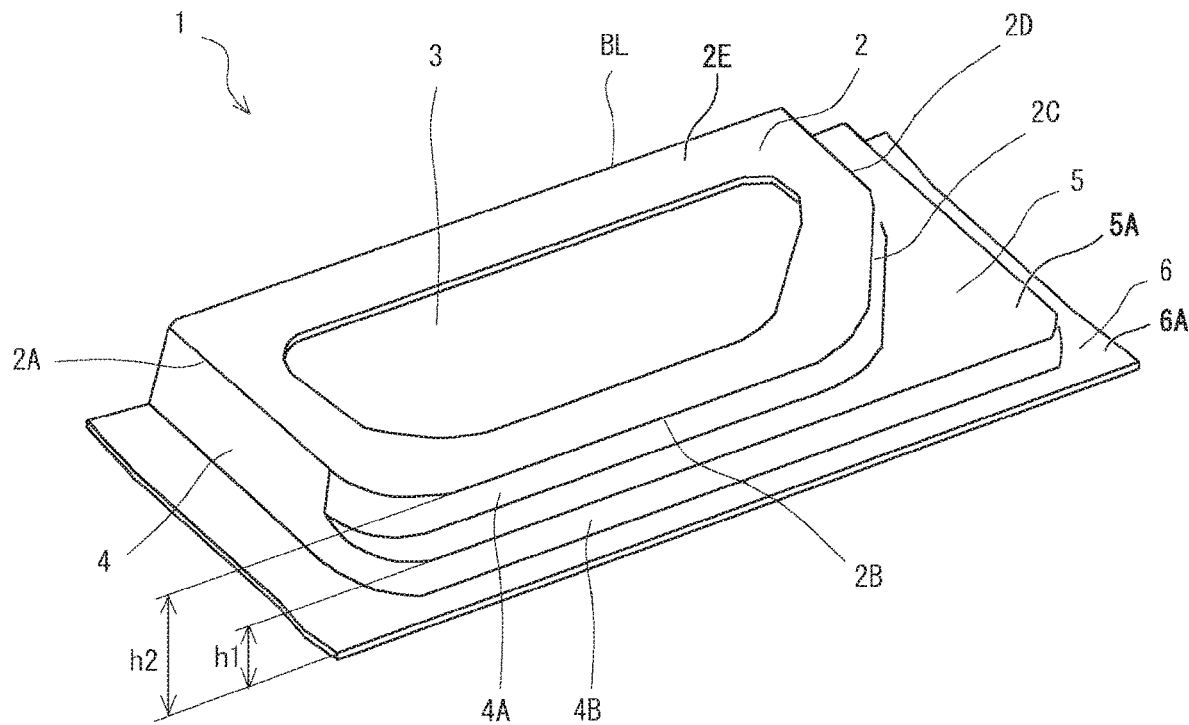
FIG. 7 is a view showing a modification example of the door inner panel according to the first embodiment.

For example, in the first embodiment, the case of the four adjacent standing wall portions 4 (three sets of the standing wall portions 4) having the level difference portion 5 has been described. However, as shown in FIG. 7, three adjacent standing wall portions 4 (two sets of the standing wall portions 4) may have the level difference portion 5 in the door inner panel.

In addition, for example, in the first embodiment, the case of manufacturing the door inner panel 1 using the pressing apparatus 10 having one first punch 12 and one second punch 13 has been described. However, for example, the second punch 13 may be divided into a plurality of punches. That is, a pressing apparatus having one first punch and two second punches may also be used.

In addition, for example, in the first embodiment, the case of the pressing apparatus 10 having the punch 11 and the blank holder 14 in the upper portion and having the die 15 in the lower portion has been described. However, the disposition of the punch 11 and the blank holder 14 and the die 15 may be vertically switched. That is, the pressing apparatus 10 may have a constitution in which the punch 11 and the blank holder 14 relatively move with respect to the die 15.

In addition, for example, in the first embodiment, the case of the top sheet portion 2 of the door inner panel 1 having one opening portion 3 has been described. However, the top sheet portion 2 of the door inner panel 1 may have a plurality of opening portions 3.

In addition, for example, in a case in which a steel sheet is used as the blank material S used in the manufacturing method according to each of the above-described embodiments, a tailored blank may be used as the steel sheet. Tailored blanks are roughly classified into tailor welded blanks (hereinafter, also referred to as "TWB") and tailor rolled blanks (hereinafter, also referred to as "TRB"). TWB is obtained by integrating a plurality of steel sheets having different sheet thicknesses, different tensile strengths, and the like by means of welding (for example, butt welding). On the other hand, TRB has a sheet thickness that is changed by changing the interval between rolling rolls during the manufacturing of a steel sheet. The use of this tailored blank enables an increase in the strength only in necessary places, and thus it is also possible to reduce the sheet thickness. In addition, panel-like formed articles for which the tailored blank is used can also be applied to car door inner panels. Therefore, the impact characteristics of door inner panels can be improved, and furthermore, the weight reduction can be desired.

In addition, in each of the above-described embodiments, the case of manufacturing the car door inner panel as the panel-like formed article have been described. However, the present invention is not limited only to the above-described application and can also be used for, for example, cars, construction machinery, aircrafts, and the like.

BRIEF DESCRIPTION OF THE REFERENCE SYMBOLS

1: DOOR INNER PANEL (PANEL-LIKE FORMED ARTICLE)
2: TOP SHEET PORTION
3: OPENING PORTION
4: STANDING WALL PORTION
4A: TOP SHEET PORTION-SIDE STANDING WALL PORTION
4B: FLANGE PORTION-SIDE STANDING WALL PORTION
5: LEVEL DIFFERENCE PORTION
6: FLANGE PORTION
10: PRESSING APPARATUS
12: FIRST PUNCH
13: SECOND PUNCH
14: BLANK HOLDER
15: DIE
BL: BELT LINE
S: BLANK MATERIAL

What is claimed is:

1. A method for manufacturing a panel article having a polygonal top sheet portion, standing wall portions extending from, out of sides of the top sheet portion, at least two adjacent sides, and a level difference portion provided in each of the standing wall portions constituting at least one set of adjacent standing wall portions, the method comprising:
preparing a blank material made of a metal sheet having a tensile strength of 390 MPa or more and 980 MPa or less; and
press-forming the blank material in a cold manner to form the blank material into the panel article,
wherein, in the press-forming,
by using a pressing apparatus having a die which has a contour-carving portion in which a shape of the panel article is formed,
a first punch which faces the die and has a front end surface in which a shape of the top sheet portion is formed,
a second punch which is adjacent to an outside of the first punch, faces the die, and has a front end surface in which a shape of the level difference portion is formed, and a blank holder which is adjacent to at least a part of an outside of the second punch and faces the die, wherein the first punch and the second punch are individually movable with respect to the die and the blank holder,
the blank material is disposed between the die and the blank holder, the first punch, and the second punch, the blank holder, the first punch, and the second punch are relatively moved with respect to the die, thereby pressing the first punch and the second punch to the blank material, and
pressing of the second punch to the blank material is completed earlier than pressing of the first punch to the blank material.

2. The method for manufacturing the panel article according to claim 1,
wherein, in the press-forming, the pressing of the first punch to the blank material begins when or after the pressing of the second punch to the blank material is completed.

3. The method for manufacturing the panel article according to claim 1,
wherein, in the press-forming, the pressing of the first punch to the blank material begins before the pressing of the second punch to the blank material is completed.

4. The method for manufacturing the panel article according to claim 1,
wherein, when a depth from a criterion surface facing the blank holder to a level difference surface facing the second punch is represented by d1 (mm), and a depth from the criterion surface to a contour bottom surface facing the first punch is represented by d2 (mm), the contour-carving portion of the die of the pressing apparatus satisfies $d2 \geq 40$ and $d1/d2 < 0.8$.

5. The method for manufacturing the panel article according to claim 1,
wherein the blank material is a steel sheet.

6. The method for manufacturing the panel article according to claim 5,
wherein the steel sheet is a tailored blank.

7. The method for manufacturing the panel article according to claim 1,
wherein the blank material has an opening portion at a location corresponding to the top sheet portion.

8. The method for manufacturing the panel article according to claim 2,
wherein, when a depth from a criterion surface facing the blank holder to a level difference surface facing the second punch is represented by d1 (mm), and a depth from the criterion surface to a contour bottom surface facing the first punch is represented by d2 (mm), the contour-carving portion of the die of the pressing apparatus satisfies $d2 \geq 40$ and $d1/d2 < 0.8$.

9. The method for manufacturing the panel article according to claim 3,
wherein, when a depth from a criterion surface facing the blank holder to a level difference surface facing the second punch is represented by d1 (mm), and a depth from the criterion surface to a contour bottom surface facing the first punch is represented by d2 (mm), the contour-carving portion of the die of the pressing apparatus satisfies $d2 \geq 40$ and $d1/d2 < 0.8$.

* * * * *